United States Patent Office 3,027,795
Patented Apr. 3, 1962

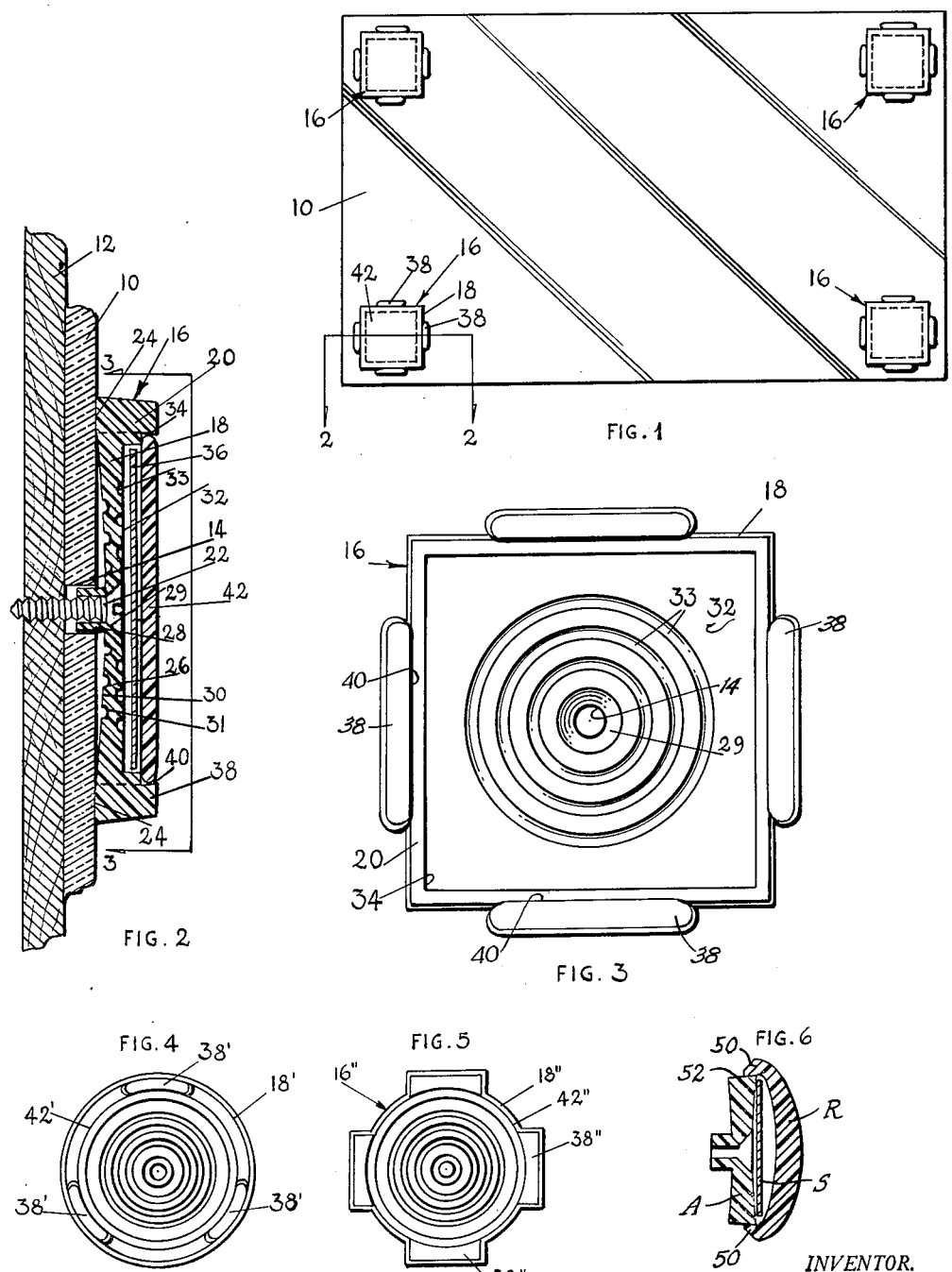

3,027,795
HANGER BOLT AND RESILIENT DECORATIVE ABUTMENT WASHER
Giorgio I. Spadaro, 602 N. Woodland Lane, Northfield, Ill.
Filed Oct. 27, 1958, Ser. No. 769,601
5 Claims. (Cl. 85—53)

This invention relates to a connector for hanging wall mirrors or the like, and more particularly relates to a decorative connector which is adapted to extend through a bolt-receiving aperture in the device which is adapted to be hung on a wall.

At present, wall mirrors are hung either by means of edge-gripping hangers or by means of hanger bolts or screws which are caused to extend through apertures provided in the mirror for hanging purposes. In the latter mirror-hanging operation the hanger screw is usually hand-wrapped at the site with a length of felt or rubber which the artisan attempts to fit into the aperture in the mirror to serve as a shield between the threads of the screw shank and the walls of the aperture. If the mirror's aperture is not properly protected from the hanger screw, there may occur expensive damage, such as by chipping of the mirror. In any event, it is a troublesome and time-consuming labor problem in actual practice to wrap felt or rubber on each mirror-hanging screw and to fit the felt-wrapped screw in the apertures provided therefor.

Thus, one object of this invention is to provide a new and improved hanger means, for apertured wall mirrors or the like, which avoids the aforenoted problems.

Another object of this invention is to provide an improved hanger means for mirrors or the like which is particularly characterized by its simplicity and inexpensiveness of construction and by its efficiency of use.

A further object of this invention is to provide a hanger for mirrors or the like which combines an abutment member for transmitting loads, from the hanger screw, with a protecting sleeve for interposition between the hanger screw and the body being hung.

The type of hangers being used today are also usually provided with a tapped hole extending axially into the head and shank of the hanger screw or bolt, for receiving therein a decorative member which overlies the head of the hanger bolt to hide same and to provide an attractive ornamental appearance. Clearly such a construction utilizes a more expensive mounting bolt than an ordinary threaded member.

Thus, it is still another object of this invention to provide a novel hanger construction which avoids the expense of a tapped bolt or screw and which nevertheless provides simple means for effecting an attractive ornamental appearance of said hanger.

Still a further object of this invention is to provide a wholly novel arrangement of a combination hanger and decorative means for efficiently hanging a mirror or the like, and which provides a means for easily and quickly effecting changes in the decorative effect attained by use of the said hanger.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a front elevational view illustrating a wall mirror that is mounted on a support wall by means of the novel hangers embodying the invention disclosed herein.

FIGURE 2 is an enlarged cross-sectional view taken through one of the hangers substantially on line 2—2 of FIGURE 1.

FIGURE 3 is a front elevational view taken substantially on line 3—3 of FIGURE 2 and with the releasable retainer and the decorative insert removed from the abutment member.

FIGURE 4 is a reduced elevational view similar to FIGURE 3 and showing the form of device embodying the invention.

FIGURE 5 is an elevational view showing still another form of the hanger device embodying the invention disclosed herein.

FIGURE 6 is a diagrammatic side cross-sectional view showing still another modified form of hanger device embodying the invention disclosed herein.

Referring now to the drawings, there is shown in FIGURES 1 and 2 a wall mirror, generally indicated at 10, which is adapted to be mounted on a support, or wall, 12. The wall mirror 10 is provided with a plurality of hanger-receiving bores, or apertures, 14 therethrough, located adjacent the corners of the mirror. The improved hanger, or connector, for use in supporting the wall mirror 10 is generally indicated at 16, and the details of connector 16 are more fully disclosed in FIGURES 2 and 3.

Referring now to the hanger, or connector, 16, the said device includes a plate-like abutment member 18 having an enlarged rim portion 20. The plate-like abutment member 18 has a rearward side, which is adapted to be positioned adjacent the mirror 10, and a forward side. A headed bolt 22 is provided for securing the abutment member 18 to the support wall 12, and since the bolt 22 extends through mirror 10 it also provides support means for the mirror.

The rear side of the abutment member 18 is shaped to define outermost abutment portions 24 which, as shown in the drawings, is peripherally disposed in surrounding relation with the remaining portions of the plate-like abutment member 18. The abutment portions 24 are adapted to engage the forward face of the mirror 10 in an abutment plane.

Extending radially inwardly from the peripheral abutment portions 24, are web portions 26. The web portions 26, as best seen in FIGURE 2, extend forwardly of the abutment plane in which the abutment portions 24 are located, so that the web portions 26 are spaced away from the surface of the mirror 10. Preferably the rear wall of web portions 26 inclines progressively forwardly as the web extends radially inwardly from the abutment portions 24, thereby imparting a slightly frustoconical contour to the rear side of abutment member 18. Extending rearwardly from the central portion of the web 26 there is a tubular stud, or sleeve, 28.

The tubular sleeve 28 is of an external dimension smaller than the size of the aperture 14 in the mirror 10, to permit of a sliding fit of the tubular stud 28 into the aperture 14. The stud 28 extends rearwardly of the abutment plane so that when the abutment portions 24 in said abutment plane engage the face of the mirror 10, the tubular stud 28 extends into an aperture 14, and the stud 28 thus serves to position the abutment member 18 in selected position relative to an aperture 14 in the mirror. The sleeve 28 also serves to protect the edges of the aperture 14 from the threads of the shank of bolt 22 which extends rearwardly through the mirror for attachment to a mounting means such as support wall 12. The forward portion of the plate-like abutment member 18 is provided with a beveled bore 29 which is adapted to matingly receive the beveled head of the screw bolt 22.

Inasmuch as the web portions 26 of the plate-like abutment 18 extend forwardly of the front side of mirror 10, the said web portions 26 serve in part as a spring means to impress a tension on the mounting bolt 22, since the web means may be resiliently biased rearwardly under the influence of mounting bolt 22. The tubular sleeve 28 permits of relative sliding movement into the mirror aperture 14 under the bias of mounting bolt 22. In order to provide additional resiliency in the web portions 26, the rear wall 30 may be circularly grooved as at 31 and/or the front wall 32 of web 26 may be circularly grooved as at 33, to provide greater flexibility to the web 26. In the event that both the front wall 32 and the rear wall 30 are both grooved, as shown in FIGURE 2, then the grooves 31 and 33 are radially offset with respect to each other, so as to avoid undue weakening of the web 26.

The enlarged rim portion 20 of the abutment member 18 extends forwardly of the web 26 and is shaped to define a first rim means, or shoulder portion, 34, located forwardly of web 26 and which is adapted to receive therein an insert or sheet of decorative material 36. The location of shoulder 34 is such that, upon receiving the sheet of decorative material 36, the said decorative sheet 36 is positioned forwardly of the headed mounting bolt 22 so as to overlie both the head of mounting bolt 22 and the said web portions 26. The enlarged rim 20 is also provided a second rim means, or shoulder portion, 38 positioned forwardly of the first rim means 34. The second rim means 38 has an undercut peripheral inner wall portion 40 such that the second rim means 38 is adapted to releasably receive, by a press-fit thereinto, a relatively rigid, flat, retainer 42 which serves to retain the decorative material 36 in position. The retainer 42 is preferably formed of transparent material which serves to permit viewing of the decorative insert therethrough. Preferably, the second rim means 38 is segmented, as best seen in FIGURE 3, as this permits of greater resiliency of said rim means for receiving the retainer 42 in a press-fit assembly and also permits of access to portions of retainer 42 for the purpose of removal, if desired.

In an actual form of construction, the abutment member 18 which includes web portions 26, rim portion 20, and tubular sleeve 28, is a single unitary member. The single member thus defined may be formed of any transparent plastic material, or of any other material as desired. The transparent retainer 42 may be formed of a similar material, or of any other material, as desired. In the event that the retainer 42 is formed of a decorative material, it would not be necessary to utilize a decorative insert 36, as disclosed in FIGURES 2 and 3.

FIGURES 4 and 5 show alternate forms of constructions of the basic device shown in FIGURES 2 and 3. In FIGURES 2 and 3, the abutment member 18 is primarily square in overall shape and the retainer-receiving rim means 38 includes four segments, as best seen in FIGURE 3. In FIGURE 4, the abutment member 18′ is primarily a circular member, and three uniformly spaced, retainer-receiving outer rim portions 38′ are provided for releasably receiving a circular retainer 42′. In FIGURE 5, the basic form of the abutment member 18″ is circular, but the retainer-receiving rim portions 38″ are four in number and are disposed in generally rectangular arrangement, as shown in FIGURE 3, but said rim portions 38″ have circular inner edges for releasably receiving a circular retainer 42″.

FIGURE 6 illustrates diagrammatically modified construction of certain elements of this invention. In the prior forms of this invention the abutment member 18 has an outwardly projecting rim portion 20 which is shaped to define a first shoulder, for receiving a decorative overlay sheet 36, and second shoulder means having inturned portions for receiving a retainer plate 42 press-fit thereinto. In FIGURE 6, the abutment member A is shown of generally the same form as abutment member 18, and a decorative overlay sheet S is provided; but the overlay sheet retainer R is shown to have spaced fingers, or portions, 50 which are inturned and which press fit over the outer periphery of abutment member A, which outer periphery may have an outwardly and forwardly sloped peripheral edge 52 for securely, but releasably, receiving the retainer R press-fit thereonto.

It will be seen that the hanger or connector here disclosed is superior to existing constructions since the abutment member thereof provides both means for locating the abutment member relative to the mirror aperture and also provides sleeve means for protecting the edge of the mirror aperture from the mounting bolt, and the web means of the abutment member provides a shock and vibration absorbing pad and a certain resiliency which maintains the mounting bolt under relative tension, thereby preventing the mounting bolt from working loose, and preventing the mirror from receiving undesired stresses which might otherwise cause chipping, breakage, or toher damage to the mirror. The device further is susceptible of decorative embellishments which may be selectively changed, as desired, or as the decor of the room is varied, and the entire arrangement is of a very neat, yet inexpensive and efficient construction.

The abutment member and decorative overlay sheet retainer are preferably formed of a plastic, such as a styrene or linear polyethylene. The parts may be transparent or translucent, clear or colored, of straight sides or shaped in any desired ornamental form. The two parts need not be of the same material, and, for example, the abutment member may be of a somewhat resilient plastic, and the press-fit retainer part may be of metal or other material. If the retainer is opaque, then there may be no need for the decorative overlay sheet, and the retainer itself may be shaped, colored, embossed or the like to provide decorative embellishments.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A decorative hanger means comprising, in combination, an abutment member having forward and rearward sides, a headed hanger bolt extending through said abutment member and adapted to engage a support to bias said abutment member rearwardly toward said support, said abutment member being shaped to define, on its rearward side, abutment surfaces, which are adapted to engage the surface of a body to be supported by said hanger means, located substantially in a single abutment plane and being disposed in surrounding and spaced relation to said hanger bolt, said abutment member defining web means extending from adjacent said abutment surfaces toward said hanger bolt and extending forwardly of the said abutment plane, a tubular stud carried by said web means and extending rearwardly therefrom and terminating rearwardly of said abutment plane, said hanger bolt slidably extending axially through said tubular stud and terminating rearwardly of said stud, with the head of said hanger bolt engaging the forward side of said abutment member, decorative means carried on said abutment member and positioned forwardly of the head of said hanger bolt for hiding the head of the hanger bolt, said decorative means including segmented rim means spaced forwardly of said web means for receiving therein a decorative insert positioned forwardly of the head of the hanger bolt, and a retainer releasably received by a press fit in said segmented rim means for retaining said decorative insert in position, said segmented rim means being undercut to provide lip means for releasably holding said retainer in position.

2. A device as set forth in claim 1 including at least one circumferential groove in said web means serving to increase the axial flexibility of said web means.

3. A device as set forth in claim 1 wherein said web means are shaped and dimensioned to be resilient to permit flexing thereof and to permit axial rearward movement of said stud under the bias of said mounting bolt.

4. A device as set forth in claim 1 wherein said abutment member has a rectangular periphery and wherein one of the segments of said segmented rim means is located along each of the peripheral edges of said rectangular abutment.

5. A device as set forth in claim 1 wherein said abutment member has a generally circular periphery and wherein the segmented rim means includes at least three spaced segments.

References Cited in the file of this patent

UNITED STATES PATENTS

| 176,104 | Weathers | Apr. 11, 1876 |
| 2,214,030 | Pereles | Sept. 10, 1940 |
| 2,275,315 | Ray | Mar. 3, 1942 |
| 2,540,790 | Kost | Feb. 6, 1951 |
| 2,678,585 | Ellis | May 18, 1954 |
| 2,706,656 | Roubal | Apr. 19, 1955 |
| 2,756,795 | Clingman | July 31, 1956 |

FOREIGN PATENTS

| 453,048 | Germany | Nov. 26, 1927 |
| 811,389 | Great Britain | Apr. 2, 1959 |